United States Patent [19]

Lore

[11] Patent Number: 5,039,171
[45] Date of Patent: Aug. 13, 1991

[54] MULTI-PANEL THRUST REVERSER DOOR

[75] Inventor: Xavier R. Y. Lore, Beuzeville la Grenier, France

[73] Assignee: Societe Anonyme Dite Hispano-Suiza, Sainti-Cloud, France

[21] Appl. No.: 469,056

[22] Filed: Jan. 23, 1990

[30] Foreign Application Priority Data

Aug. 18, 1989 [FR] France .................. 89 11006

[51] Int. Cl.⁵ .......................... G02K 1/70; G02K 1/72
[52] U.S. Cl. .......................... 239/265.29; 239/265.33; 60/230
[58] Field of Search .................. 239/265.19, 265.25, 239/265.27, 265.29, 265.31, 265.33; 60/226.2, 228, 229, 230, 232; 244/12.5, 110 B

[56] References Cited

U.S. PATENT DOCUMENTS

| 3,601,992 | 8/1970 | Maison | 239/265.19 |
| 3,605,411 | 9/1971 | Maison et al. | 239/265.19 |
| 3,837,411 | 9/1974 | Nash et al. | 239/265.29 |
| 4,410,152 | 10/1983 | Kennedy et al. | 239/265.27 |
| 4,485,970 | 12/1984 | Fournier et al. | 239/265.29 |
| 4,894,985 | 1/1990 | DuBois et al. | 239/265.29 |
| 4,916,895 | 4/1990 | DuBois | 239/265.29 |

FOREIGN PATENT DOCUMENTS 2559838 2/1984 France .
1210939 11/1970 United Kingdom .

Primary Examiner—Andres Kashnikow
Assistant Examiner—Karen B. Merritt
Attorney, Agent, or Firm—Bacon & Thomas

[57] ABSTRACT

A thrust reverser having a multi-panel construction is disclosed. The thrust reverser has a main door operatively associated with a deflector panel. The door and the deflector panel are pivotally attached to the housing so as to pivot about axially displaced pivot axes. The deflector panel and a downstream inner door panel surface extend along an ideal for flow line between the stationary upstream housing portion and the downstream housing portion when the thrust reverser is in the forward thrust mode. A cavity is defined between an upstream stationary housing portion, an upstream inner door panel surface and the deflector panel communicates with the ambient atmosphere such that the pressure acting on the upstream inner door panel surface is substantially equivalent to the ambient air pressure. The relationship between the upstream inner door panel surface and the downstream inner door panel surface is such that the higher pressure in the cold-flow air duct, which acts on the downstream inner door panel surface, urges the thrust receiver door toward its closed position.

5 Claims, 5 Drawing Sheets 5,039,171

MULTI-PANEL THRUST REVERSER DOOR

BACKGROUND OF THE INVENTION

The present invention relates to a thrust reverser for a turbofan-type turbojet engine in which pivotable thrust reverser doors change the direction of the flow of air passing through a cold-flow air duct to provide the necessary thrust reversing forces.

Turbofan-type turbojet engines are well known in the art and, typically, comprise an annular housing concentrically arranged around the turbojet engine housing to define an annular cold-flow air duct extending along the longitudinal axis of the engine. A fan, driven by the turbojet engine, is located in the upstream portion of the cold-flow air duct to force air through the duct and augment the thrust of the turbojet engine.

In such turbofan-type turbojet engines having a relatively high bypass ratio, a thrust reversing device may be associated with the annular housing to redirect the air passing through the cold-flow air duct to provide a thrust reversing force. It is known to provide one or more pivotable thrust reversing doors in the annular housing to redirect the cold-flow air through openings in the housing.

A typical prior art installation is illustrated in FIGS. 1 and 2 and comprises annular housing 1, a thrust reverser 2 and a downstream housing portion 3. The upstream housing portion 1 comprises an outer surface panel 4 and an inner surface panel 5 interconnected by a frame structure 6. Similarly, downstream housing portion 3 has an inner surface panel 3a and an outer surface panel 3b.

The thrust reverser 2 comprises a pivotable door 7 and an actuator 7a interconnecting the door 7 with the frame structure 6. The actuator 7a, which may be a hydraulic cylinder, is attached to the frame structure 6 and has an extendible and retractable rod attached to pivoting door 7.

The door 7 extends between upstream housing portion 1 and downstream housing portion 3 so as to normally cover a generally laterally facing opening defined by the housing when the turbofan engine operates in the forward thrust mode. In this mode, as illustrated in FIG. 1, the outer door panel 9 is substantially flush with the outer surface panel 4 and the outer downstream surface panel 3b to provide a smooth air flow (indicated by arrow 10) over the exterior of the housing.

The piston rod of the actuating cylinder 7a is connected to internal structure 12 of the thrust reverser door 7. Internal structure 12 interconnects the outer door panel 9 with the inner door panel 11, which panels are also connected at their upstream edges by baffle member 13.

In known fashion, extension of the piston rod of actuator 7a causes the door 7 to pivot with respect to the housing such that its upstream end portion swings outwardly while its downstream end portion swings inwardly to block off the air flow 15 flowing through the cold-flow air duct. The air is redirected by the door outwardly through the lateral opening in the annular housing to provide a thrust-reversing force. When the door is in the open, thrust-reversing position, deflection edge 8, extending from the inner housing panel 5, minimizes the turbulence of the air passing outwardly through the opening. Baffle member 13 imparts a forward vector to the air passing through the lateral opening to increase the efficiency of the door. In order to achieve the maximum efficiency, baffle member 13 must extend beyond the surface of the inner door panel 11.

When the door is in its closed position, as illustrated in FIG. 1, an internal cavity 16 is formed, bounded by the inner door panel 11, the extending portion of the baffle member 13, the deflection edge 8 and a theoretical air flow line 14 extending between the inner surface panel 5 and the inner surface 3a of the downstream housing portion 3. Line 14 represents the ideal theoretical air flow through the cold-flow air duct. The presence of cavity 16 causes disturbances in the air flow 15, thereby reducing the efficiency of the device in the forward thrust mode. When in this mode, seal member 17 contacts the inner side of outer door panel 9 to prevent entry of the ambient air.

Typical examples of such known thrust reversing systems may be found in U.S. Pat. Nos. 4,410,152 and 4,485,970 as well as French Patent 2,559,838.

Various systems have been proposed to eliminate the presence of cavity 16, while still maintaining the efficiency of the baffle member 13. Such systems have included movable baffle members, as well as inner door panels 11 which move relative the outer door panel 9 as the door is moved between the opened and closed positions. While these systems have achieved a modicum of success, they inherently result in a thrust reversing door system of undesired complexity. Typical examples of such systems may be found in U.S. Pat. No. 4,894,985 as well as U.S. Pat. No. 4,916,895.

It is imperative that the door 7 remain in its closed position and be deployed only when desired, during the landing and braking stages when the aircraft is on the ground. Known mechanical locking devices are provided to lock the door in the closed positions. However, it is desirable that the door 7 be maintained in its closed position even if the mechanical locking device should fail. The inadvertent opening of a thrust reverser door could result in the loss of control of the aircraft with consequent catastrophic results. In some known thrust reverser systems, such as that illustrated in U.S. Pat. No. 4,485,970 the air pressure forces acting on the pivoting door tend to urge the door into an opened position. This quite possibly could, upon failure of the mechanical locking device, cause an inadvertent opening of the thrust reverser door.

SUMMARY OF THE INVENTION

A thrust reverser having a multi-panel construction is disclosed. The thrust reverser has a main door having an outer door panel and an inner door panel and is operatively associated with a deflector panel. The door and the deflector panel are pivotally attached to the housing so as to pivot about axially displaced pivot axes.

The inner door panel has an upstream panel surface and a downstream panel surface. The deflector panel and the downstream inner panel surface extend along an ideal air flow line between the stationary upstream housing portion and the downstream housing portion when the thrust reverser is in the forward thrust mode. This provides a substantially continuous surface between these stationary elements to provide a smooth passage for the air passing through the cold-flow air duct.

A cavity is defined between the upstream stationary housing portion, the upstream inner door panel surface and the deflector panel. Seals between the deflector panel and the inner panel of the housing, and between the deflector panel and thrust reverser door prevent communication between this cavity and the cold-flow air duct. The cavity does, however, communicate with the ambient atmosphere such that the pressure in the cavity and, consequently, the pressure acting on the upstream inner door panel surface is substantially equivalent to the ambient air pressure. The relationship between the upstream inner door panel surface and the downstream inner door panel surface is such that the higher pressure in the cold-flow air duct, which acts on the downstream inner door panel surface, urges the thrust reverser door toward its closed position.

A linkage interconnects the thrust reverser door to the deflector panel such that, when the thrust reverser door is moved to its open, thrust reversing position, the deflector panel also moves to a thrust reversing position about its pivot axis. In their opened positions, an air passage is defined between the deflector panel and the inner surface of the thrust reverser door to stratify and control the air flow passing through the lateral opening in the housing during the thrust reversing operation.

The thrust reverser according to the invention eliminates the turbulence generating cavity when the thrust reverser door is in its closed position, while at the same time, provides for increased efficiency in redirecting the cold-flow air during the reverse thrust operating mode. The device according to the invention minimizes the complexity and weight of the thrust reverser doors, important criteria in aeronautical applications.

The thrust reverser door according to the invention also increases the safety factor by substantially preventing the possibility of an inadvertent opening of the thrust reverser door should the mechanical locking devices fail. The air pressures acting on the door tend to urge it toward its closed position and maintain it in this position, even in the absence of mechanical locking devices.

DETAILED DESCRIPTION OF THE PREFERRED EMBODIMENT

The present invention will be described in terms of a single thrust reverser door, but it is to be understood that the housing may incorporate a plurality of such doors without exceeding the scope of this invention. The exact number of thrust reverser doors will, of course, depend upon the size of the engine and its location with respect to the aircraft structure.

Figure 1:
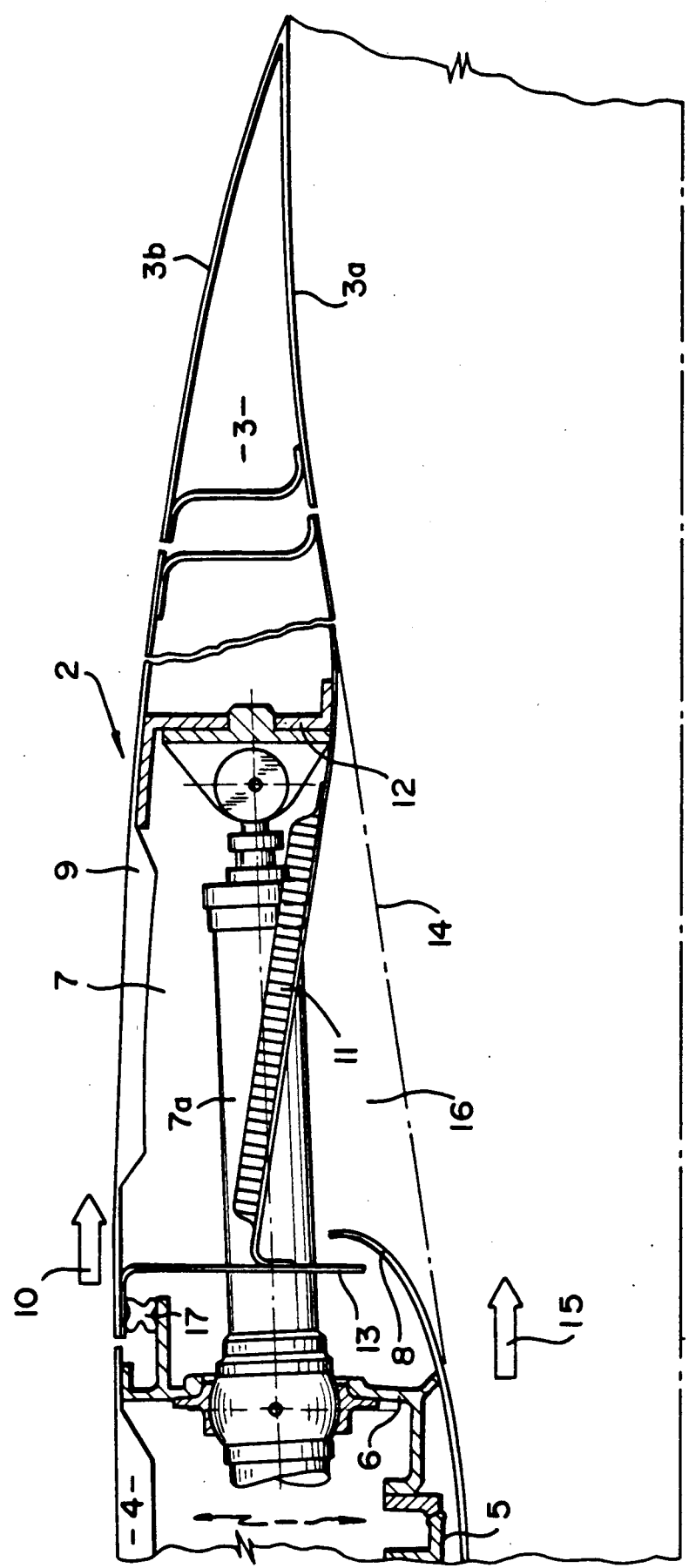
FIG. 1 is a partial, longitudinal, cross-sectional view illustrating a known thrust reverser door structure.
Figure 2:
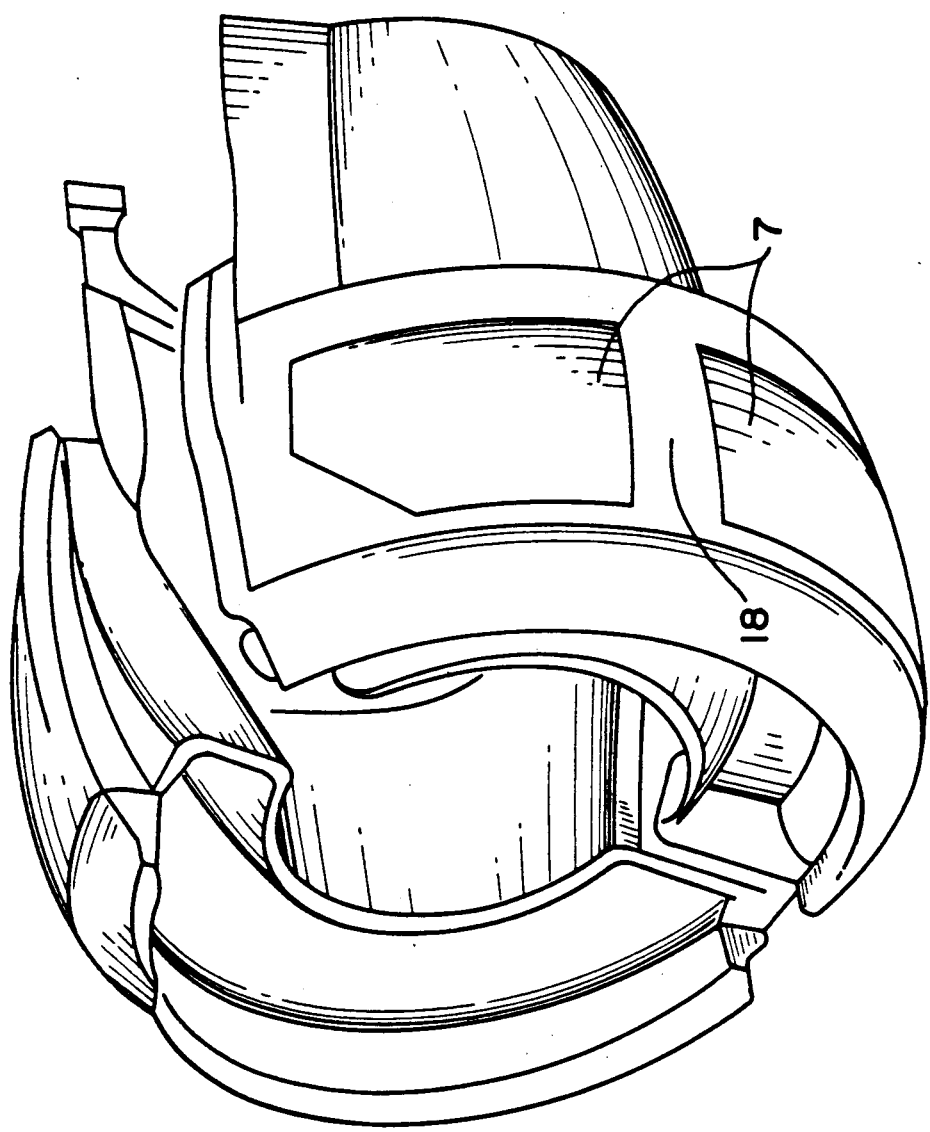
FIG. 2 is a partial, perspective view of an engine housing incorporating the thrust reversers of FIG. 1.
Figure 3:
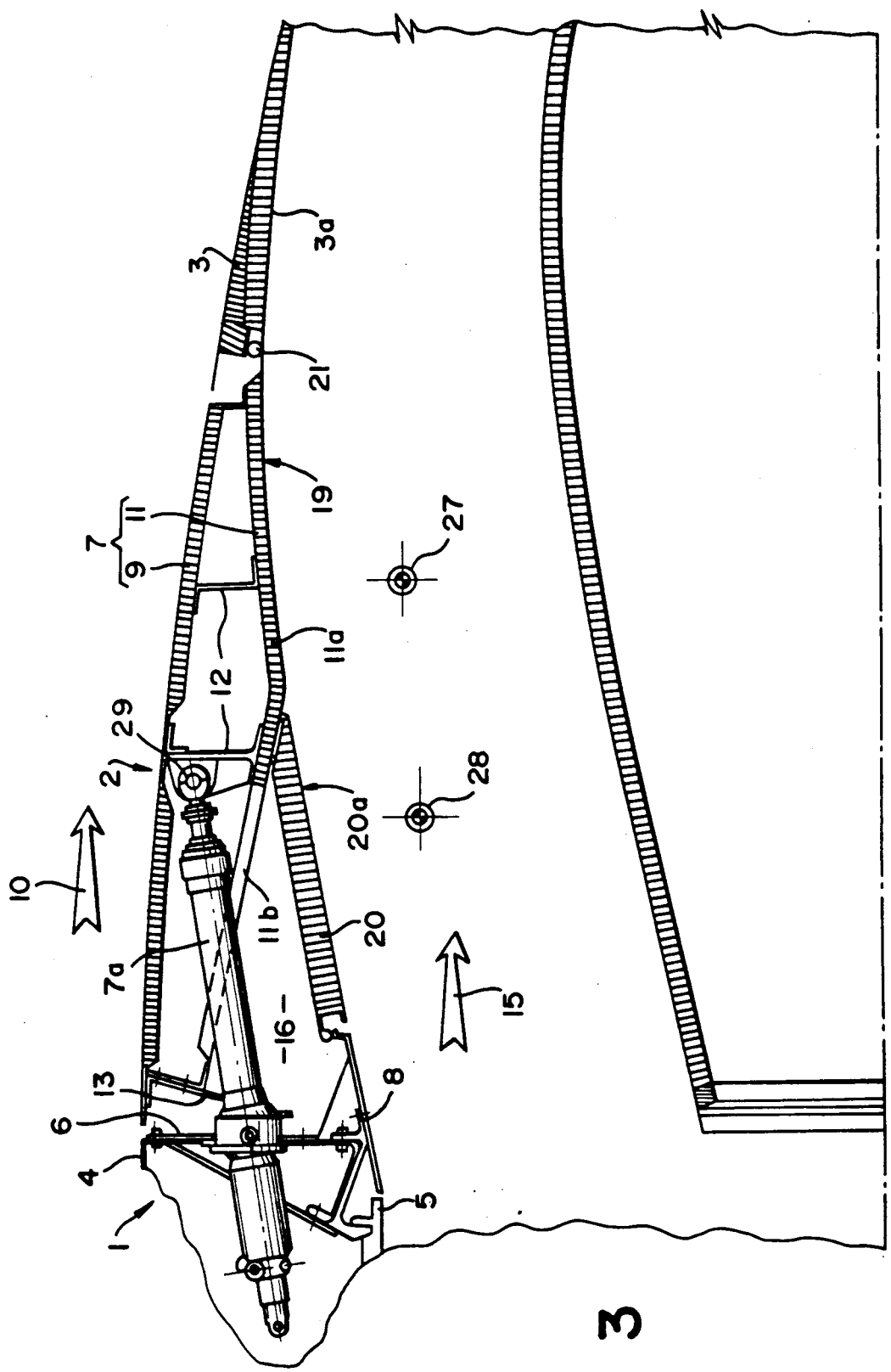
FIG. 3 is a partial, longitudinal, cross-sectional view of the thrust reverser door according to the present invention taken along a longitudinal plane passing through the door actuator.
Figure 4:
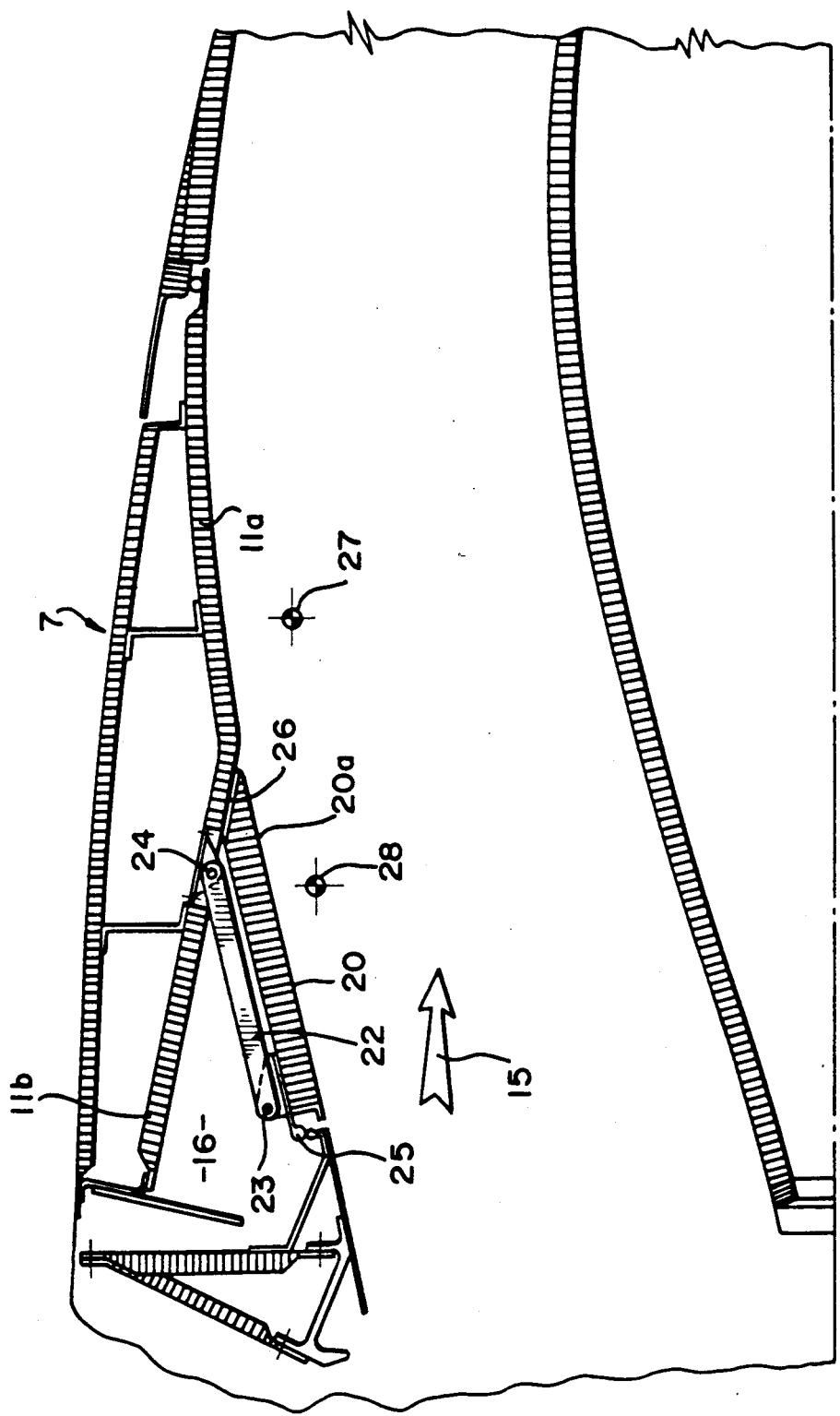
FIG. 4 is a view similar to FIG. 3 taken along a longitudinal plane that is circumferentially displaced from the position in FIG. 3.
Figure 5:
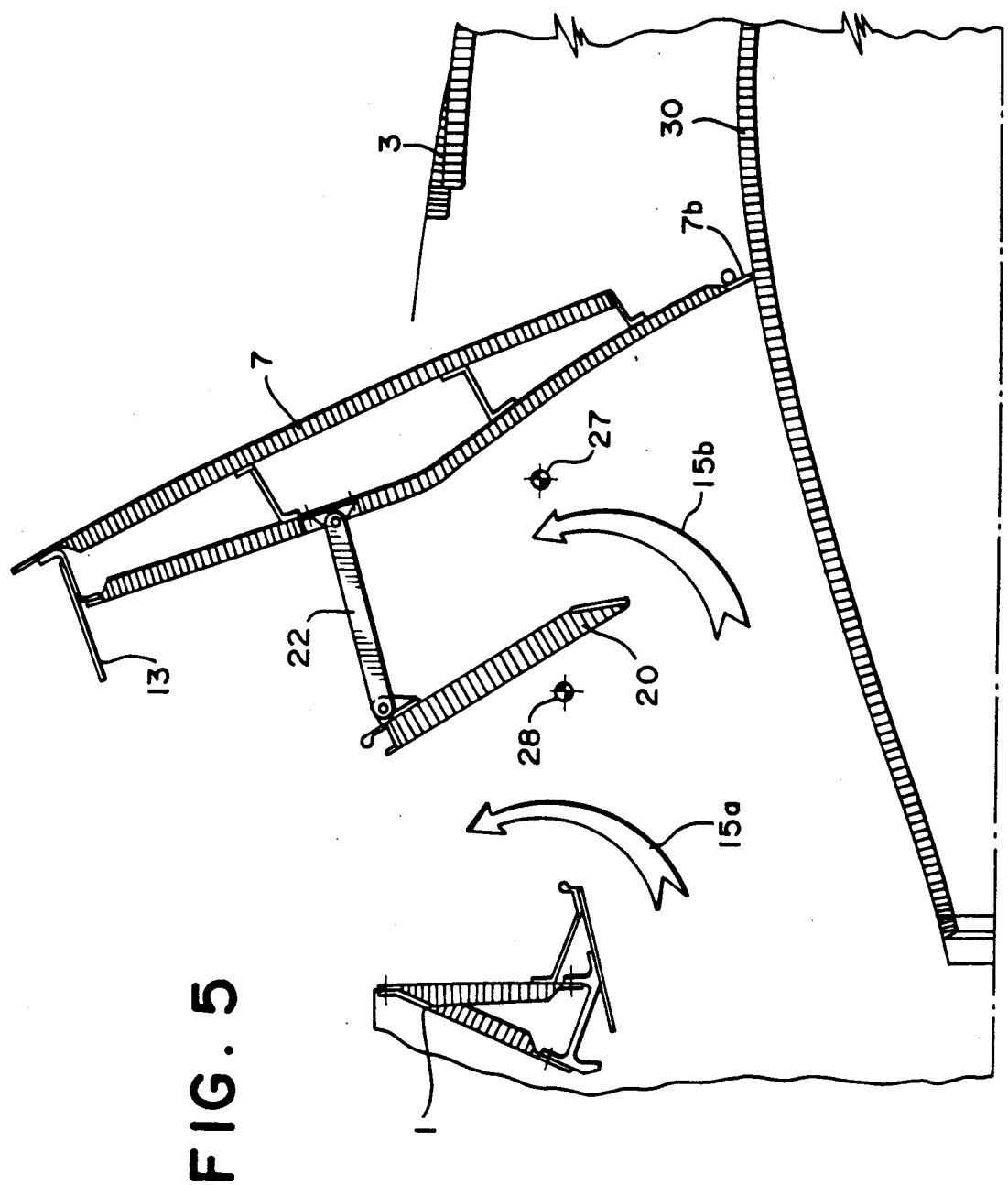
FIG. 5 is a partial, longitudinal, cross-sectional view of the device according to the invention similar to FIG. 4, but showing the thrust reverser door in the open, thrust reversing position.

Elements having the same or similar structure and/or function as the known prior art device, shown in FIGS. 1 and 2, have been assigned the same numerals in FIGS. 3-5. Thus, the upstream housing portion 1 comprises outer housing panel 4, and inner housing panel 5 joined by frame structure 6. Similarly, downstream housing portion 3 defines a generally laterally facing opening with the upstream housing 1 which is normally covered by thrust reverser door 7 when in the closed, forward thrust position. As illustrated in FIG. 3, in this position, the air 15 passing through the cold flow air duct passes from the upstream end to the downstream end and augments the thrust generated by the turbojet engine.

Thrust reverser door 7 is moved between the open and closed positions by actuator 7a, again, being attached to the frame structure 6 and having an extendible and retractable piston rod attached to the internal structure 12 of the door 7 via pivot 29. Internal structure 12 interconnects the outer door panel 9 and the inner door panel 11. Inner door panel 11 has a downstream inner door panel surface 11a and an upstream inner door panel surface 11b. The upstream end of surface 11b is connected with the upstream edge of outer door panel 9 by deflector baffle member 13. As in the known prior art, baffle member 13 extends beyond the surface of the upstream inner door surface 11b to impart a forward vector to the air during the reverse thrust mode of operation.

The invention also encompasses a main deflector panel 20 operatively associated with the thrust reverser door 7. In known fashion, thrust reverser door 7 is attached to the housing so as to be movable about generally laterally extending pivot axis 27. Similarly, deflector panel 20 is pivotally attached to the housing so as to pivot about pivot axis 28 which, as illustrated in FIGS. 3-5, is axially displaced from pivot axis 27.

As best illustrated in FIGS. 4 and 5, the deflector panel 20 is operatively attached to the thrust reverser door 7 via one or more link rods 22. The link rods 22 are pivotally attached at one end to the door panel 20 by pivot attachment 23 and, at the opposite end, to the thrust reverser door by pivot attachment 24. When the thrust reverser door 7 is pivoted to its open, thrust reversing position, as seen in FIG. 5, link rod 22 causes the deflector panel 20 to pivot about its pivot axis 28 to assume an open, air deflecting position. The air passing through the cold flow air duct is then directed generally outwardly through the laterally facing opening in the housing as indicated by arrows 15a and 15b. Air flow portion 15b passes through a passage defined between deflector panel 20 and the inner panel 11 of the thrust reverser door and has a forward vector imparted thereto through its contact with baffle member 13. In this position, the downstream edge 7b of the thrust reverser door 7 seals against a casing 30 of the turbojet engine to redirect substantially all of the cold flow air through the lateral opening.

When the thrust reverser door 7 and the deflector panel 20 are in their forward thrust positions, the inner deflector panel surface 20a and the downstream inner door panel surface 11a lie substantially on the ideal air flow line 14 of FIG. 1. This provides a substantially continuous surface approximating the ideal air flow between the inner panel 5 and the downstream housing inner surface 3a, thus minimizing air turbulence in the cold-flow air duct.

Seals 25, interposed between three sides of the deflector panel 20 and the housing 1, as well as seal 26 interposed between the downstream edge of deflector panel 20 and the thrust reverser door 7, prevent any communication between the cold flow air duct and the cavity 16. Cavity 16 is defined by the deflector panel 20, the frame structure 6 and the upstream inner door panel surface 11b.

Cavity 16 communicates with the ambient atmosphere such that the pressure within the cavity is substantially equal to the ambient air pressure. This communication may be achieved by eliminating the seal between the upstream edge of the thrust reverser door 7 and the housing 1. Quite obviously, other means of achieving this communication may be utilized as desired.

Thus, the pressure forces acting on the upstream inner door panel surface 11b are generated by the ambient air pressure which is lower than the air pressure within the cold flow air duct. This higher, cold-flow air duct pressure acts on downstream inner door panel surface 11a. The relationship between the surfaces 11a and 11b are such that the resultant forces exerted on the thrust reverser door 7 by the respective air pressures tend to urge the door 7 toward its closed position and to retain the door in the closed position as illustrated in FIGS. 3 and 4. This prevents any inadvertent opening of the thrust reverser door 7, even upon failure of the mechanical locking devices.

The respective forces acting on the thrust reverser door 7 also reduce the loads and forces required to be exerted on the door by the actuator 7a. This, in turn, enables the reduction in the size and overall bulk of the actuator 7a.

The foregoing description is provided for illustrative purposes only and should not be construed as in any way limiting this invention, the scope of which is defined solely by the appended claims.

I claim:

1. A thrust reverser for a turbojet engine having a housing extending along a longitudinal axis and defining at least one generally laterally facing opening, an upstream outer housing surface and an upstream inner housing surface located upstream of the generally laterally facing opening, and a downstream outer housing surface and a downstream inner housing surface located downstream of the generally laterally facing opening, the upstream and downstream inner housing surfaces defining a boundary of a gas flow stream at a higher pressure than ambient atmosphere, comprising:
   (a) a thrust reverser door having an inner door panel surface defining an upstream portion and a downstream portion;
   (b) first means for pivotally attaching the thrust reverser door to the housing such that the thrust reverser door pivots about a first pivot axis between a closed, forward thrust position wherein the thrust reverser door covers the generally laterally facing opening, and an open, reverse thrust position wherein the thrust reverser door uncovers the generally laterally facing opening and directs the gas flow stream outwardly through the generally laterally facing opening;
   (c) a deflector panel having an inner panel surface;
   (d) second means pivotally attaching the deflector panel to the housing such that the deflector panel pivots about a second pivot axis between a closed position and an open position;
   (e) link means operatively connecting the deflector panel and the thrust reverser door such that, when the thrust reverser door is in its closed position, the deflector panel is also in its closed position, wherein the inner deflector panel surface and the inner door panel surface are substantially contiguous with the upstream and downstream inner housing surfaces and a cavity is defined by the upstream portion, the deflector panel and the housing, and when the thrust reverser door is in its open position, the deflector panel is also in its open position;
   (f) actuator means operatively interposed between the housing and the thrust reverser door to move the thrust reverser door between its closed and open positions, the actuator means being directly attached to the thrust reverser door;
   (g) means allowing the cavity to communicate with ambient atmosphere such that ambient air pressure acts on the upstream portion of the inner door panel surface; and
   (h) seal means interposed between the deflector panel and the housing, and the deflector panel and the thrust reverser door to prevent communication between the gas flow stream and the cavity, such that the gas flow stream pressure acts only on the downstream portion of the inner door panel surface, thereby exerting a resultant force on the thrust reverser door due to the pressure differential between the gas flow stream and the ambient atmosphere urging the thrust reverser door to its closed position.

2. The thrust reverser according to claim 1 wherein the first and second pivot axes are located such that in their open positions, the deflector panel and the thrust reverser door define a passage therebetween for stratifying and controlling the reversed gas flow stream.

3. The thrust reverser according to claim 1 wherein the first and second pivot axes are spaced apart in a direction along the longitudinal axis.

4. The thrust reverser according to claim 1 wherein the first and second pivot axes are substantially parallel.

5. The thrust reverser according to claim 1 wherein the link means comprises:
   (a) at least one link rod having first and second end portions;
   (b) first means pivotally connecting the first end portion to the deflector panel; and,
   (c) second means pivotally connecting the second end portion to the thrust reverser door.

* * * * *

UNITED STATES PATENT AND TRADEMARK OFFICE
CERTIFICATE OF CORRECTION

PATENT NO. : 5,039,171

DATED : August 13, 1991

INVENTOR(S) : Lore

It is certified that error appears in the above-identified patent and that said Letters Patent is hereby corrected as shown below:

Abstract, line 7, delete "for" and insert --air--;
line 20, delete "receiver" and insert --reverser--.

Signed and Sealed this

Sixteenth Day of November, 1993

Attest:

BRUCE LEHMAN

Attesting Officer

Commissioner of Patents and Trademarks